INVENTORS
ARTHUR VON HIPPEL
MORTIMER C. BLOOM
ATTORNEY

CURRENT DENSITY
8 AMPERES per SQUARE FOOT
TEMPERATURE 55°C

SOLUBILITY LIMIT
for 840g $SeO_2$

UNITED STATES PATENT OFFICE 2,568,780

RECTIFIER MANUFACTURING PROCESS AND PRODUCTS OBTAINED THEREBY

Arthur von Hippel, Weston, and Mortimer C. Bloom, Newton Highlands, Mass., assignors to Federal Telephone and Radio Corporation, New York, N. Y., a corporation of Delaware Application March 1, 1947, Serial No. 731,834

10 Claims. (Cl. 204—56)

This application is a continuation in part of copending application Serial No. 496,760 filed by the same applicants on July 30, 1943, which in turn is a continuation in part of application Serial No. 420,906 filed November 29, 1941, by the same applicants, now abandoned.

This invention relates generally to improvements in processes for the manufacture of asymmetric electrical conductors useful in rectifying alternating current and in particular it is concerned with a novel process for producing a new improved type of selenium rectifier.

According to one of the best of the presently practiced commercial processes, selenium rectifiers are manufactured by applying to a metallic base plate pulverised amorphous selenium to which has been added a conductivity promoting agent, heating initially to soften or fuse the selenium preferably under pressure thereby causing it to distribute itself as a substantially uniform coating on the plate and then later converting it completely from the amorphous to the gray or metallic variety, applying a metallic conductor as a counterelectrode, and thereafter electroforming to develop the rectifying qualities of the element.

However this procedure, entirely aside from the fact that it is essentially a piece-work and not a continuous operation, presents many problems that are very difficult to solve under usual conditions of operation even though highly skilled technicians are employed and arbitrary empirical standards of procedure and intermediate products are rigidly enforced. For example, when applying the pulverised selenium to the base plate, extreme care must be exercised to assure that it is distributed in a substantially continuous and uniform layer upon the plate as otherwise, in the subsequent heating, the softened or fused material may fail to coalesce with the result that in the finished rectifier the counterelectrode will make direct contact with the base plate and cause a short circuit. This operation is further complicated by the contraction of the volume of the selenium when the amorphous form is converted to the metallic form which also can produce discontinuities in the film unless special precautions are taken. Also under these conditions, the heating can cause superficial oxidation of the exposed area of the base plate with the result that even if selenium is then applied to this area it will not adhere and make satisfactory electrical contact. When it is considered that the selenium layer in a rectifier element is made very thin in order to minimize the forward resistance it becomes obvious that producing a continuous and uniform coating according to this present day practice demands a high degree of technical skill both in the manufacturing itself and also in the critical examination of the intermediate product.

Various expedients, none wholly satisfactory, have been suggested to overcome even partially the shortcomings of this prior art procedure. In particular, it has been suggested that the base plate could be initially coated with selenium by condensing it thereon in vacuum. This procedural modification was intended to prevent oxidation of the base plate, prevent contamination of the selenium layer during the coating operation and, in general, to promote the manufacture of a uniform product. However, this process has not satisfied industrial needs because it merely adds a costly operating condition demanding highly skilled and specialized technique—operating in vacuum—with resultant increased cost of but without material improvement in product. Furthermore the elements thus coated with selenium must still be heat processed as heretofore to obtain the desired layer of metallic selenium and during these operations the difficulties above mentioned are therefore still encountered. A further difficulty encountered in the above described process lies in the step wherein a conductivity promoting agent is incorporated in the amorphous selenium; the problem presented here essentially is to secure a homogeneous mixture of the selenium and the agent, which cannot readily be obtained because most of the agents now used are employed in almost insignificant proportions, say about 20 milligrams of agent per 100 grams of selenium, with resultant difficulty in producing a uniform mixture.

In addition to the technical problems presented by these existing commercial processes which to a measure inhibit large scale exploitation of the selenium rectifier by restricting its availability, the rectifiers thus far marketed have not been entirely satisfactory as regards uniformity of electrical properties and efficiency as rectifiers. This lack of uniformity has been traceable in a large measure to variations in manufacturing procedure but also has been due to impurities in the selenium, in the base plate or in the counterelectrode material which, even though present in traces so minute as almost to defy detection, may materially and adversely affect the rectifying properties of the selenium. The electrical efficiency of present-day selenium rectifiers has not been considered wholly satisfactory due to the substantial amount of electrical energy thermally dissipated because of the relatively high resistance of the selenium layer.

The objects of this invention include providing a new, simple, easily operated and commercially practicable process for manufacturing selenium rectifier elements, free from the disadvantages above mentioned, and which is capable of producing rectifiers having a uniformity of electrical characteristics and an efficiency of operation to a degree hitheto unachieved in commercial production.

In accordance with this invention, these objects are achieved by directly electrolytically depositing metallic selenium upon the metallic base plate as the cathode during electrolysis of an aqueous electrolyte containing tetravalent selenium cations, preferably an aqueous solution of selenium dioxide or selenious acid. At least the initial period of this electrolysis is conducted at an elevated temperature for reasons hereinafter appearing. The selenium deposits obtained by practice of this new process are tenaciously adherent to the base plate and are substantially entirely composed of the metallic form of selenium free from the red form of the element.

Among the major advantages of this process are that it can be operated as a continuous process and the selenium can be deposited as an essentially uniform continuous layer upon nonplanar surfaces, neither having been practicable heretofore.

One of the advantages of this process which is of special significance in the manufacture of selenium rectifiers is that it permits variation of the physical properties of the deposit within a wide range and also it permits variation and unusual improvement of the rectifying properties in terms of forward and reverse electrical resistance. For example, rectifiers made from electrodeposited material wherein the selenium layer is approximately 0.003 inch in thickness, after electroforming, have passed 25 milliamperes per square centimeter at 1.1 volts in the more readily conducting direction and less than 0.15 milliampere per square centimeter at 18 volts in the less readily conducting direction, both measurements having been made at room temperature. This is in contrast to good samples of prior art rectifiers which passed 25 milliamperes per square centimeter at 1.1 volts in the more readily conducting direction and about 1 milliampere per square centimeter at 18 volts in the less readily conducting direction, both measurements having been made at room temperature.

A further advantage of this novel process for producing selenium rectifiers is that the selenium deposit is invariably obtained as a continuous film irrespective of how thin the deposit may be. This arises from the fact that the selenium film presents resistance to electrical current flow during the electrolysis, hence it will be obvious that any discontinuities in the film would immediately constitute foci for further deposition of the selenium. By reason of this phenomenon, rectifiers utilizing extremely thin selenium layers may be made which have a correspondingly very low resistance to current flow in the more readily conducting direction. For example, rectifiers have been made by this process wherein the selenium layer had a thinness of 0.0015 inch, which passed 50 milliamperes per square centimeter at 1.1 volts in the more readily conducting direction and less than 0.55 milliampere per square centimeter at 18 volts in the less readily conducting direction, both measurements having been made at room temperature.

An additional advantage of the process according to this invention, which is of particular importance in the manufacture of selenium photocells, is that the light absorptive qualities of the selenium may be altered by adjustment of the conditions of electrolysis, for example, the color of the deposits may be varied from light gray to deep black with corresponding change in reflectivity for visible light from about at least 25% to 4% or less. This variation in appearance of the deposit is due to variation in the size and orientation of the individual crystallites which constitute the mat. The size of the crystallites may be varied from sub-microscopic dimensions up to a size readily observable with the naked eye and the orientation of the individual crystallites may be varied from the condition in which substantially all of the crystallites are C axis oriented normally to the supporting surface to a condition in which the C axis is far from normal to this surface.

A further advantage arising from practice of this process, which is of especial significance in the application of protective coatings, is that the deposit is corrosion resistant and is non-porous even though its thickness is less than about .0001 inch. It of course will be understood that by the term corrosion resistant is meant resistance to any corrosive action to which metallic gray selenium is corrosion resistant.

To facilitate a better understanding of the presently invented process, certain data pertaining thereto are embodied in graphs illustrated in the accompanying drawings.

Figure 1:
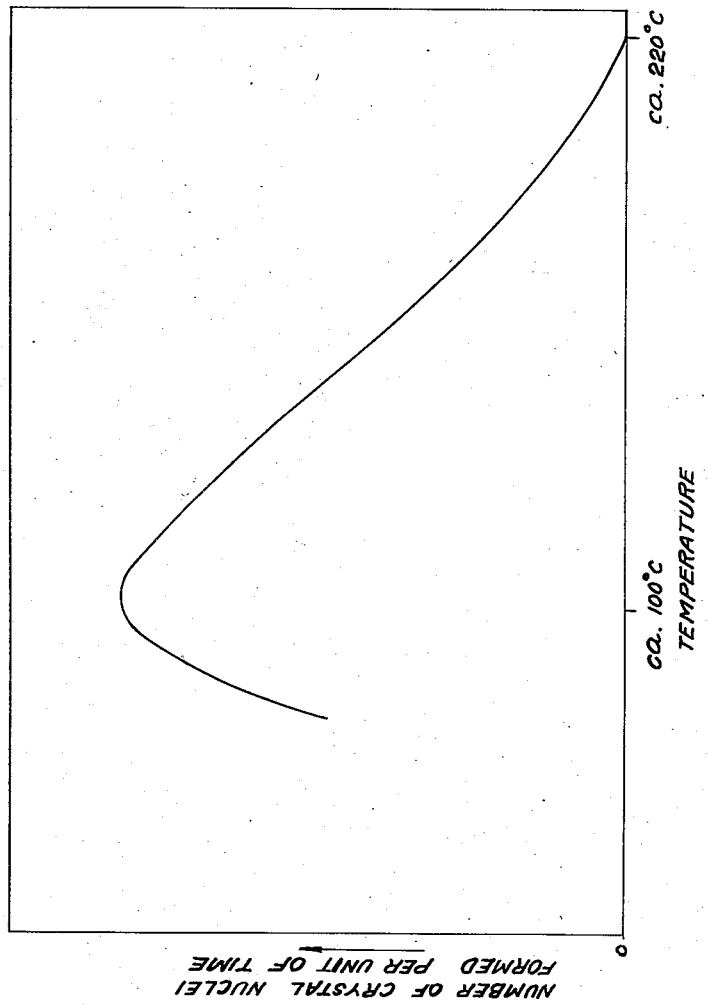
Figure 1 is a graph illustrating the relationship of temperature variation to the rate of transformation of amorphous selenium to nuclei of gray crystalline selenium.

In connection with the development of the process according to this invention it was found that at room temperature electrolysis of a selenious acid solution yielded a cathodic deposit of red selenium which, as it increased in thickness, correspondingly increased in electrical resistance until it formed an insulative coating on the electrode. An investigation of how a coating of amorphous selenium could be thermally or otherwise converted to the gray metallic crystalline form of selenium included an examination of the rate of this conversion in terms of temperature. The data derived from this investigation is summarized in Figure 1 of the drawings from which it will be evident that the maximum rate of conversion from the undesired amorphous form to the desired gray crystalline form occurs at a temperature of approximately 100° C. although with less satisfactory results somewhat higher or somewhat lower temperatures could be used. It was then discovered that if the initial amorphous layer had been thus converted to the metallic gray variety, further electrodeposition resulted in a thickening of this gray metallic deposit without any deposition of the red form of selenium. For this reason it is apparent that the optimum condition for practice of the process of this invention includes operation at a temperature of about 100° C., for at least the initial period.

It is known that selenium dioxide, when dissolved in water yields selenious acid and it is also known that selenious acid, by progressive dissociation, yields two hydrogen ions:

$$SeO_2 + H_2O = H_2SeO_3 \quad (1)$$

$$H_2SeO_3 = H^{+1} + HSeO_3^{-1} \quad (2)$$
$$= H^{+1} + SeO_3^{-2} \quad (3)$$

However selenious acid also can yield water and tetravalent selenium ions:

$$H_2SeO_3 + 4H^+ = Se^{+4} + 3H_2O \quad (4)$$

Examination of the reaction coefficient:

$$K = \frac{[Se^{+4}][H_2O]^3}{[H_2SeO_3][H^+]^4} \quad (5)$$

makes evident that the thermodynamic concentration of the tetravalent selenium ions in the reaction mixture will vary in the 4th power as the thermodynamic concentration of the hydrogen ion is changed and in the reciprocal third power as thermodynamic concentration of the water is altered, and in direct ratio as the thermodynamic concentration of the selenious acid is changed. Thus it will be perceived that in order to secure the desired high thermodynamic concentration of tetravalent selenium ions the thermodynamic concentration of the hydrogen ion and the thermodynamic concentration of the selenious acid are to be maintained at the highest practicable values, and the thermodynamic concentration of water in the equilibrium mixture is to be reduced as far as possible.

From Equation 1 above it will be seen that addition of selenium dioxide to the aqueous mixture apart from the volume change which reduces the water concentration still further, reduces the water concentration by consuming one molecule of water per molecule of selenium dioxide added and also increases the selenious acid concentration to a chemically equivalent degree. In addition, high hydrogen ion concentration in the equilibrium mixture not only promotes the production of tetravalent selenium ions from the selenious acid as in Equation 4 above but additionally suppresses the dissociation as in Equations 2 and 3 above.

In harmony with these facts it is found, in accordance with this invention, that the reaction of Equation 4 above can be utilized advantageously when determining conditions for the electrolytic cathodic deposition of selenium.

In this electrodeposition the electrolyte preferably comprises a highly concentrated solution of selenium dioxide in a highly acidic medium. Low concentrations of selenium dioxide in the electrolyte, for obvious reasons inasmuch as it is the sole source of selenium for the deposition, impose severe limitations upon the rate of selenium deposition. Low concentrations of acid, i. e., low hydrogen ion concentrations, result in a low ratio of tetravalent selenium ions to hydrogen ions, thus limiting the current densities which may be used without hydrogen evolution. This last condition, namely hydrogen evolution at the cathode, is particularly undesirable in rectifier manufacture because the bubbles of gas are likely to adhere to the cathode surface and interfere with the formation of a continuous deposit.

Figure 2:
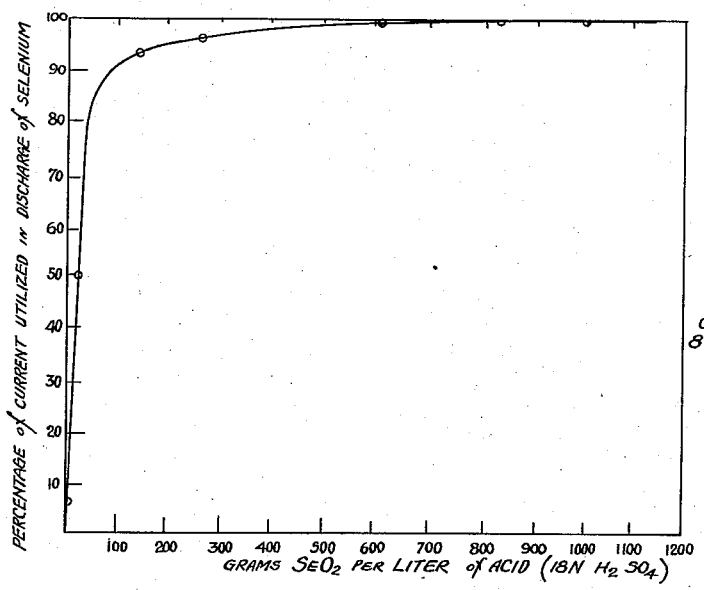
Figure 2 is a graph indicating the relationship of selenium dioxide concentration in the electrolyte with the cathode efficiency for selenium deposition.

Referring to Figure 2 of the drawings, it will be seen that the cathode efficiency, i. e., the ratio of the weight of selenium deposited on the cathode to the weight of selenium theoretically capable of being deposited on the cathode during electrolysis increases with increase of selenium dioxide concentration in the electrolyte until full efficiency is achieved, i. e., the current is fully utilized for converting the selenium from the tetravalent to the zero-valent state. This agreement between the theoretically and the actually necessary current magnitudes clearly demonstrates that tetravalent selenium ions are utilized.

Under these conditions, the total cathode reaction is:

$$H_2SeO_3 + 4H^+ + 4E = Se^0 + 3H_2O$$

It is to be clearly understood that upon electrolysis of the electrolyte, the current is utilized either for depositing selenium or for causing hydrogen evolution, hence as these factors are related in the sense that their sum is unity, and the hydrogen evolution is undesirable when making the rectifier elements, one of the optimum conditions for practice of the presently invented process is the use of a sufficiently high concentration of selenium dioxide in the electrolyte to assure 100% cathode efficiency, i. e., no evolution of hydrogen.

Figure 3:
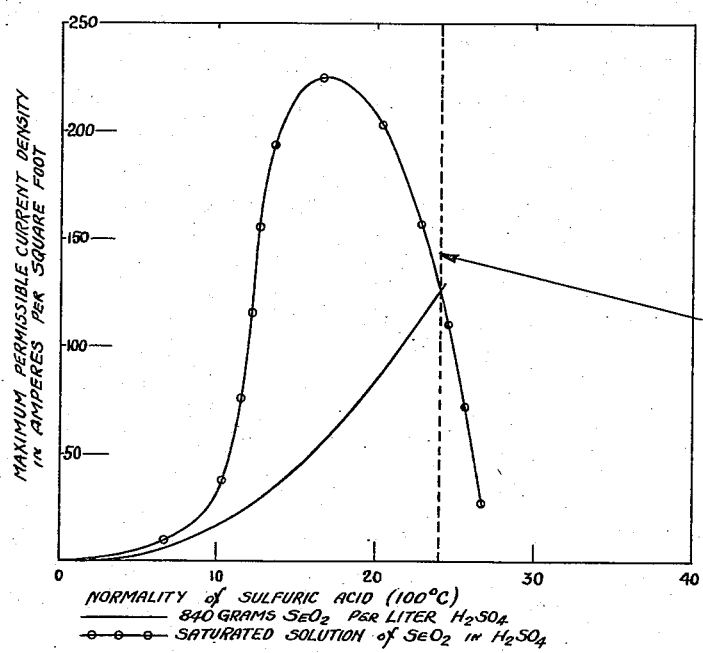
Figure 3 is a graph illustrating the relationship of maximum permissible current density in the electrolysis to the acid normality at different concentrations of selenium dioxide in the electrolyte.

The conditions under which this desired full cathode efficiency may be achieved are made evident upon reference to Figure 3 from which it will be seen that the maximum permissible current density which can be used for selenium deposition without hydrogen evolution increases as the acid and selenium dioxide content of the electrolyte are increased until the solubility limit of the selenium dioxide in the acid is reached or until the acid reaches such concentrations that thereafter ionization progressively diminishes.

A further and major factor affecting satisfactory operation of the presently invented process is the temperature at which the electrolysis is performed, as has been mentioned above in the discussion of Figure 1. Crystal nuclei which produce the desired form of selenium are created at a useful rate only in a limited temperature range and the rate of formation of such nuclei, in addition to their velocity of growth, are functions of temperature.

It has been determined in connection with this invention that the effective generation of gray metallic selenium by nuclei formation occurs at useful rates between temperatures of about 55° C. and about 140° C., the upper and lower useful limits varying somewhat as other factors are changed. The rate of formation of nuclei of the gray form passes through a maximum value at a temperature in the neighborhood of 90° C. to 100° C., and drops speedily on either side of this interval to relatively low values.

When the other factors are suitably controlled the optimum temperature range is between about 75° C. and about 125° C. If the bath is operated at temperatures outside this range, i. e. temperatures at which the transformation velocity from the red into the gray form is very low, any red material initially formed stays as such for a long time. When the bath temperature is maintained within the optimum range specified corresponding to rapid nuclei formation, any selenium deposited in the red form transforms sufficiently rapidly into the gray metallic selenium that any material interference with the electrolytic process by the undesired red material is avoided. Moreover, once the initially amorphous deposit is transformed to the desired gray crystalline form, either by operation in the optimum temperature range or otherwise, subsequent deposition can be carried on outside this range without further formation of the undesired red product. At temperatures above the optimum range, this further deposition can be carried on at higher than normal current densities without hydrogen evolution, but at temperatures below the optimum range, lower than normal current densities must be used if hydrogen evolution is to be avoided.

Another factor affecting operation of this process involves both the selection of a suitable acid and regulation of its concentration. The selected acid must be adapted for use in concentrations at which the desired concentration of hydrogen ions will be present in the solution and at these concentrations it must be free from any material tendency to attack the base plate or the selenium deposit.

The metal selected for the base plate will of course be an important factor in determining the suitability of particular acids. In general, the common strong inorganic mineral acids have been found to be preferable, sulfuric acid being the most satisfactory under usual conditions, although selenic acid is also satisfactory. Nitric acid, although satisfactory in most respects, has disadvantageous reactivity in high concentrations. Weak acids, such as the phosphoric acids, may also be used, but since they produce low hydrogen ion concentrations and have high viscosities they are less desirable.

Excellent deposits can be obtained on platinum, nickel, silver, antimony, steel and other metals; and it is preferred to choose the acid to be employed with regard to the metal used as a cathode so as to prevent attack on the cathode by the acid. Where it is necessary or desirable from the standpoint of speed or economy to employ, as the cathode, a metal which tends to react with the acid used in the bath, special precautions must be taken in initiating the plating in order to prevent the acid from acting on the cathode before the selenium plating is started. In some cases such adverse action can be substantially avoided by applying the current as soon as the cathode is inserted into the bath, which can be accomplished by connecting up the electrodes and turning on the current before immersing the cathode.

Moreover, when the cathode metal is readily attacked by the acid, certain other precautions may be employed. One suitable procedure is to connect the current source in reverse polarity before immersing the "cathode." Thus, when this "cathode" is first immersed it is actually an anode and the positive hydrogen ions are kept away from the metal of the "cathode." A thin coating of a selenide, selenate (or possibly some other compound) of the "cathode" metal appears to be thus formed. Thereafter the current is reconnected in its regular polarity so that the cathode is negative and plating commences. The thin protective coating appears to have no substantial deleterious effect, but does protect the metal from the action of the positive hydrogen ions which might attack it at the commencement of plating, with consequent prevention of pitting or formation of a deposit of red amorphous selenium due to chemical reaction. For instance, a bath containing selenic acid for the above-described brief reverse current treatment of the "cathode" may be used even if some other bath is to be used for the actual plating, since the formation of a selenide or selenate (or other selenium compound) which results from such treatment is particularly advantageous as a preliminary to the plating of selenium upon the cathode.

It will be evident that the proper conditions for obtaining the deposition of gray metallic selenium include a number of interrelated variable factors, hence it is not practicable to state the limits of each of these factors for all values of each of the other factors. However, typical ranges of variation of the main factors affecting the process will be evident from the drawings.

The term selenium coated article as used herein embraces selenium rectifiers, and selenium photocells and objects bearing a protective coating of selenium of the type hereinabove described; by an electrodeposited selenium coating is meant a coating of the type obtained by practice of the hereindescribed process, whether due to electrolysis or due to other phenomena occurring under the conditions of operation; and by tetravalent selenium ions is meant tetravalent selenium cations per se or a cation containing tetravalent selenium capable of discharging metallic selenium at the cathode upon electrolysis as above described. By the term electrolyte is meant a solution capable of conducting an electric current and of being decomposed thereby. A strong acid is one that is highly dissociated to give hydrogen ions in solution even at merely moderate dilutions, for example sulfuric acid.

To facilitate a clearer understanding of the matter of the present invention and how the process may advantageously be practiced, certain specific examples thereof follow but it is clearly to be understood that these examples are provided by way of illustration and not by way of limitation.

*Example 1*

An electrolyte is prepared by dissolving pure selenium dioxide in slightly more than an equal weight of pure water at room temperature, and the solution is then filtered using precautions to prevent contamination. The solution is then concentrated by heating and pure sulfuric acid is added in a quantity such that the resultant electrolyte contains the following substances in substantially indicated proportions:

Selenium dioxide _____ about 1225 grams
Sulfuric acid (sp. gr. 1.84) __ about 370 ml.
Water _____ about 370 ml.

This electrolyte is placed in a container formed of a material inert to the electrolyte under conditions of use, e. g. glass, stainless steel and the like, which is provided with a suitable protective cover for excluding contaminants and is equipped with such auxiliary apparatus as may be desired for supporting the electrodes therein while immersed in the electrolyte. Preferably the container also is provided with auxiliary apparatus for circulating the electrolyte therein during the electrolysis and also means for permitting temperature control of the electrolyte, particularly for maintaining it at a preselected temperature without significant variations.

The electrodes used in the electrolysis are fabricated from an electrical conductor which is inert to the electrolyte under the conditions of use, e. g. platinum or the like, and are cleaned by operations conventional in the electrochemical arts before use, e. g. acid washing, electrocleaning, pickling and the like, after which they are carefully rinsed and immersed in the electrolyte.

After assembly of the apparatus, a source of direct current is connected with the electrodes. This source should be capable of supplying sufficient current to maintain a current density of at least 100 amperes per square foot of cathode surface under the conditions of electrolysis. While maintaining the electrolyte temperature at about 100° C., the electrolysis is begun at a current density of 10 amperes per square foot of cathode surface which, after about 10 minutes, is increased to about 100 amperes per square foot and the electrolysis is then continued for an additional period about 22 minutes. The deposit formed initially on the cathode is a film of red selenium which is transformed very rapidly to the metallic form of selenium as the electrolysis proceeds. After this electrolysis is completed, the cathode is removed from the electrolyte and is observed to be coated with an adherent deep black velvet-like deposit comprising microscopic filamentary crystallites of metallic selenium, C-axis oriented substantially normal to the electrode surface. After application of a metallic counterelectrode upon the selenium surface in the usual manner, say by spraying with a readily fusible alloy, the rectifier element is finished by electroforming as in present day practice.

The rectifier thus obtained even though no addition agent has been incorporated with the selenium will exhibit rectifying properties at least equivalent to those of the best present commercial products.

Example 2

The process set forth in Example 1 is repeated with the modification that the current density during the electrolysis is maintained at 10 amperes per square foot of cathode surface for a sufficient time to produce a deposit of equivalent thickness, i. e. for about 230 minutes. After this electrolysis is completed, the cathode is removed from the electrolyte and is observed to be coated with an adherent deposit which does not have the deep black velvet-like deposit of Example 1 but is somewhat grey. After application of a metallic counterelectrode upon the selenium surface in the usual manner, the rectifier element will be observed to electroform with great rapidity yielding a rectifier having an exceptionally high resistance in the less readily conducting direction and being capable of operation at exceptionally high voltage.

Example 3

The process set forth in Example 1 is repeated except that the electrolyte is maintained at a more elevated temperature, e. g. 125° C. or higher. During about the first 10 minutes of electrolysis the initially deposited red film will have developed a comparatively small number of isolated nuclei of the grey form and thereafter the deposit will form preferentially on these spots. As the electrolysis proceeds, additional nuclei will form at a slow rate while the deposit becomes increasingly thicker on the spots already transformed to the grey metallic form. The electrolysis must therefore be continued for a substantial period of time before the red film is transformed and the resulting structure will be one of peaks and valleys, these phenomena being increasingly manifested with increase in operating temperature. From the foregoing it will be evident that operation of the presently invented process under these conditions requires too long a period of time to be wholly satisfactory for commercial use.

Example 4

The process set forth in Example 1 is repeated except that the electrolyte is maintained at a less elevated temperature, e. g. 75° C., or lower. During the first 10 minutes of electrolysis the initially deposited red film will be punctured at spots due to the evolution of hydrogen gas bubbles and while the red film will gradually transform to grey metallic selenium, the resultant deposit will be pitted, the bits usually extending through to the base plate, the phenomena being increasingly manifest with decrease in temperature of the electrolysis. From the foregoing it will be evident that operation of the presently invented process under these conditions does not yield a satisfactory coating for use in rectifier.

Example 5

The process set forth in Example 1 is repeated with the modification that the electrolyte contains no sulfuric acid. After formation of the initial red film, the resistance of the bath will increase considerably requiring considerable voltage increases to maintain the specified current density. Further operation will be accompanied by vigorous hydrogen evolution and a continuous adherent deposit will not be obtained.

Example 6

The process as set forth in Example 1 is repeated with the modification that a chemically equivalent quantity of pure orthophosphoric acid is substituted for the sulfuric acid therein employed. After formation of the initial red film, the resistance of the bath will increase considerably requiring considerable voltage increases to maintain the specified current density. Further operation will be accompanied by vigorous hydrogen evolution and a continuous adherent deposit will not be obtained.

Example 7

The process as set forth in Example 1 is repeated with the modification that the electrolyte used is composed of 85% orthophosphoric acid saturated at a temperature of about 100° C. with selenium dioxide and following the initial electrolysis for 10 minutes at a current density of about 10 amperes per square foot of cathode surface, the electrolysis is then continued for an additional period of about 29 minutes using a current density of about 75 amperes per square foot of cathode surface. The product obtained after these operations has substantially the same appearance as that of the product obtained by practice of the process of Example 1.

Example 8

The process of Example 1 is repeated with the modification that a chemically equivalent quantity of selenic acid is substituted for the sulfuric acid therein employed. The product obtained by these operations has the same acicular mat structure and properties as that obtained by practice of the process of Example 1.

Example 9

The process of Example 1 is repeated with the modifications that instead of a platinum cathode a cathode of pure annealed sheet nickel is used during the electrolysis and this cathode is allowed to remain in the electrolyte for a short period, say 15-30 seconds, prior to applications of the electrical potential. Apart from this difference in the metal base plate used, the product is identical with that obtained by practice of the process of Example 1.

*Example 10*

The process of Example 9 is repeated with the modification that the cathode is formed of steel, having thereon a substantially non-porous coating of electroplated nickel. The product obtained by practice of this modified process is similar to the product obtained by practice of the process of Example 1, except that a more finely grained deposit of selenium is obtained and a rectifier made therefrom will have a lower resistance in both the more readily conducting and in the less readily conducting directions.

*Example 11*

The process of Example 9 is repeated with the modification that the cathode is an aluminum shape having a non-porous coating of nickel electroplated thereon. The product obtained by practice of this modified process is identical with that obtained in the process of Example 10, except for the difference in the base plate composition.

It will be apparent to those versed in the art to which this invention pertains that modifications can be made in the described processes without thereby departing from the spirit and substance of this invention.

Having thus described the invention, what it is desired to secure by Letters Patent is:

1. An article of manufacture including an electrically conductive surface and a substantially continuous essentially non-porous coating upon said surface that comprises a mat substantially entirely composed of acicular microcrystallites of metallic gray selenium.

2. An article of manufacture including an electrically conductive surface and a substantially continuous, essentially non-porous coating upon said surface, dark gray to black in color and having a pile structure resembling velvet, substantially entirely comprising acicular microcrystalline gray metallic selenium.

3. An article of manufacture including an electrically conductive surface and a substantially continuous, essentially non-porous coating upon said surface that comprises gray crystalline metallic selenium directly electrodeposited thereon.

4. An article of manufacture including an electrically conductive surface and a substantially continuous, essentially non-porous coating upon said surface, dark gray to black in color, and having a pile structure resembling velvet, comprising gray crystalline metallic selenium directly electrodeposited upon said surface.

5. An article of manufacture including an electrically conductive surface and a coating thereon, said coating comprising a tenaciously adherent, non-porous substantially black pile-like mat, free from discontinuities and composed of acicular microcrystallites of metallic selenium.

6. An article of manufacture including an electrically conductive surface and a coating thereon, said coating being substantially continuous, substantially black, non-porous, tenaciously adherent to said surface and being composed of acicular gray microcrystallites of metallic selenium directly electrodeposited upon said surface.

7. An article of manufacture including an electrically conductive surface and a coating thereon, said coating comprising a tenaciously adherent, non-porous substantially black pile-like mat, free from discontinuities and composed of acicular micro-crystallites of metallic selenium, substantially all of the micro-crystallites being oriented with their C axes at least nearly normal to said surface.

8. An alternating electric current rectifier that comprises a substantially continuous, non-porous and tenaciously adherent layer of gray acicular micro-crystalline metallic electrodeposited selenium.

9. An alternating electric current rectifier that comprises a tenaciously adherent, non-porous pile-like mat, free from discontinuities and composed of acicular micro-crystallites of metallic selenium.

10. The process that comprises electrolytically depositing gray crystalline metallic selenium upon an electrical conductor as the cathode during the electrolysis of a highly concentrated aqueous solution of selenium dioxide having a high concentration of sulphuric acid dissolved therein, using a current density of approximately 10 amperes per square foot of cathode surface during the initial period of electrolysis and thereafter increasing the current density to cause discharge of gray crystalline metallic selenium at the desired rate without evolution of hydrogen at the cathode, at least the initial period of said electrolysis being conducted at a temperature in the range of about 75° C. to about 125° C.

ARTHUR VON HIPPEL.
MORTIMER C. BLOOM.

REFERENCES CITED

The following references are of record in the file of this patent:

UNITED STATES PATENTS

| Number | Name | Date |
|---|---|---|
| 1,743,160 | Presser | Jan. 14, 1930 |
| 2,030,443 | Geisler | Feb. 11, 1936 |
| 2,378,513 | Thompson et al. | June 19, 1945 |
| 2,414,438 | Bloom | Jan. 21, 1947 |

OTHER REFERENCES

La Ricerca Scientifica, vol. 10 (1939), pages 1143-1144, by G. Sella.

Chemical Abstracts, volume 34, page 2713, 1940.